United States Patent
Kumazawa et al.

(10) Patent No.: US 10,166,878 B2
(45) Date of Patent: Jan. 1, 2019

(54) POWER SUPPLY APPARATUS OF VEHICLE

(71) Applicant: TOYOTA JIDOSHA KABUSHIKI KAISHA, Toyota-shi, Aichi-ken (JP)

(72) Inventors: Suguru Kumazawa, Toyota (JP); Hideki Kamatani, Nagoya (JP); Ryoji Sato, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 145 days.

(21) Appl. No.: 15/111,833

(22) PCT Filed: Nov. 28, 2014

(86) PCT No.: PCT/JP2014/005962
§ 371 (c)(1),
(2) Date: Jul. 15, 2016

(87) PCT Pub. No.: WO2015/111105
PCT Pub. Date: Jul. 30, 2015

(65) Prior Publication Data
US 2016/0332529 A1    Nov. 17, 2016

(30) Foreign Application Priority Data

Jan. 22, 2014  (JP) ................ 2014-009585

(51) Int. Cl.
*B60L 11/18* (2006.01)
*B60L 1/00* (2006.01)
(Continued)

(52) U.S. Cl.
CPC ........... *B60L 11/1859* (2013.01); *B60L 1/003* (2013.01); *B60L 1/02* (2013.01); *B60L 7/14* (2013.01);
(Continued)

(58) Field of Classification Search
CPC .......... B60L 1/003; B60L 1/02; B60L 11/123; B60L 11/14; B60L 11/1859;
(Continued)

(56) References Cited

U.S. PATENT DOCUMENTS 4,634,956 A * 1/1987 Davis ................... H02M 3/156
323/222
2012/0069613 A1* 3/2012 Nakagawa ........ H02M 7/53871
363/78

FOREIGN PATENT DOCUMENTS

JP    2009-210478    9/2009
JP    2010-283932    12/2010
(Continued)

*Primary Examiner* — Drew A Dunn
*Assistant Examiner* — Sailesh Thapa
(74) *Attorney, Agent, or Firm* — Finnegan, Henderson, Farabow, Garrett & Dunner, LLP (57) ABSTRACT

A power supply apparatus of a vehicle includes: auxiliary machines electrically connected between a battery and a converter; and a control device controlling inverters and the like based on a required vehicle power including a required charge discharge amount of the battery. The control device has a continuous voltage step-up mode and an intermittent voltage step-up mode. In the continuous voltage step-up mode, the control device calculates the required charge discharge amount based on electric power supplied from the battery. In the intermittent voltage step-up mode, the control device changes a method of calculating the required charge discharge amount to a method that calculates the required charge discharge amount based on electric power passing through the converter, and makes the required charge discharge amount smaller than the required charge discharge amount in the continuous voltage step-up mode.

3 Claims, 8 Drawing Sheets

(51) Int. Cl.
    *B60L 1/02*      (2006.01)
    *B60L 7/14*      (2006.01)
    *B60L 11/12*     (2006.01)
    *B60L 11/14*     (2006.01)
    *B60L 15/00*     (2006.01)
    *B60L 15/20*     (2006.01)
    *H02M 3/157*     (2006.01)
    *B60W 20/13*     (2016.01)
    *H02M 1/00*      (2006.01)
    *H02M 3/158*     (2006.01)

(52) U.S. Cl.
    CPC ............ *B60L 11/123* (2013.01); *B60L 11/14* (2013.01); *B60L 11/1861* (2013.01); *B60L 11/1864* (2013.01); *B60L 11/1877* (2013.01); *B60L 15/007* (2013.01); *B60L 15/2045* (2013.01); *B60W 20/13* (2016.01); *H02M 3/157* (2013.01); *B60L 2210/12* (2013.01); *B60L 2210/14* (2013.01); *B60L 2210/30* (2013.01); *B60L 2210/40* (2013.01); *B60L 2240/12* (2013.01); *B60L 2240/14* (2013.01); *B60L 2240/34* (2013.01); *B60L 2240/36* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2240/485* (2013.01); *B60L 2240/526* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2240/80* (2013.01); *B60L 2250/26* (2013.01); *B60L 2260/26* (2013.01); *B60L 2260/54* (2013.01); *B60L 2270/20* (2013.01); *H02M 3/1588* (2013.01); *H02M 2001/0035* (2013.01); *Y02T 10/6217* (2013.01); *Y02T 10/645* (2013.01); *Y02T 10/7005* (2013.01); *Y02T 10/7044* (2013.01); *Y02T 10/7061* (2013.01); *Y02T 10/7077* (2013.01); *Y02T 10/7225* (2013.01); *Y02T 10/7233* (2013.01); *Y02T 10/7241* (2013.01); *Y02T 10/7283* (2013.01); *Y02T 10/92* (2013.01); *Y10S 903/907* (2013.01)

(58) Field of Classification Search
    CPC ............ B60L 11/1861; B60L 11/1864; B60L 11/1877; B60L 15/007; B60L 15/2045; B60L 7/14; B60L 2210/12; B60L 11/18; B60W 10/06; B60W 10/08; B60W 20/00; B60W 20/13; H02M 3/157; H02J 3/32; H02J 3/14; H02J 4/00; H02J 7/0068; H02J 13/0006; H02J 2003/003; H02J 3/28; H02J 3/383; H02J 3/386; H02J 7/0016; H02J 7/0022; H02J 7/0047; H02J 7/007; H02J 7/0081; H02J 7/0091
    See application file for complete search history.

(56) References Cited

FOREIGN PATENT DOCUMENTS

| | | | |
|---|---|---|---|
| JP | 2012147538 | * | 8/2012 |
| JP | 5286596 B2 | | 9/2013 |

\* cited by examiner

POWER SUPPLY APPARATUS OF VEHICLE

CROSS-REFERENCE TO RELATED APPLICATIONS

This application is a national phase application of International Application No. PCT/JP2014/005962, filed Nov. 28, 2014, and claims the priority of Japanese Application No. 2014-009585, filed Jan. 22, 2014, the content of both of which is incorporated herein by reference.

TECHNICAL FIELD

The present invention relates to a power supply apparatus of a vehicle.

BACKGROUND ART

A hybrid vehicle including a converter for stepping up an output voltage of a battery is known. The voltage stepped up by the converter is further converted by an inverter to an AC voltage and applied to a motor generator. When the hybrid vehicle is regeneratively braked, a voltage of electric power generated by the motor generator can also be stepped down by means of the converter to a voltage which is appropriate for charging the battery. Such a converter is required to reduce an electric power loss due to switching.

For example, a control device of a load drive system disclosed in Japanese Patent Laying-Open No. 2010-283932 (PTL 1) corrects a command value so that an absolute value of a difference between the command value and an output voltage of the converter is reduced, when an absolute value of load power is less than a predetermined value. This control device enables an output voltage of the converter to be kept even when the converter is halted. Therefore, in the case where it is unnecessary to change the output voltage, the converter can be halted. Accordingly, an electric power loss of the converter can be reduced.

CITATION LIST

Patent Literature

[PTL 1] Japanese Patent Laying-Open No. 2010-283932
[PTL 2] Japanese Patent Laying-Open No. 2009-210478

SUMMARY OF INVENTION

Technical Problem

In a hybrid vehicle, charge-discharge-amount correction control for a battery can be performed. The charge-discharge-amount correction control is the control of correcting a command value for an engine or the like so that an electric power with which the battery is actually charged/an electric power actually discharged from the battery (hereinafter also referred to as actual electric power) is equal to a required charge discharge amount Pchg. Generally, the actual electric power is measured based on a voltage VB of the battery (hereinafter also referred to as battery voltage) and a current IB which is input to/output from the battery (hereinafter also referred to as battery current).

In the case where electric current consumption of a motor generator is small, intermittent voltage step-up control may be performed by intermittently operating and stopping a converter to thereby reduce an electric power loss due to switching of the converter. The inventors of the present application have conducted a study of the control under which required charge discharge amount Pchg is set to zero in order to cause the current flowing through the converter (hereinafter also referred to as step-up current) to approach zero in a period in which the converter can be stopped. The charge-discharge-amount correction control is performed so that the actual electric power is equal to required charge discharge amount Pchg. Therefore, when required charge discharge amount Pchg is set to zero, the actual electric power also becomes zero. Accordingly, battery current IB can be made zero.

Between the battery and the converter, however, auxiliary machines such as air conditioner may be connected. Then, there arises a difference between the current flowing through the converter and battery current IB, corresponding to an amount of current consumed by the auxiliary machines. Therefore, if required charge discharge amount Pchg is set to zero in the case where the charge-discharge-amount correction control is performed based on battery current IB, a step-up current of zero cannot be obtained while battery current IB is made zero. Namely, because the step-up current flows, an electric power loss of the converter still occurs.

The present invention has been made to solve the problem above, and an object of the present invention is to provide a power supply apparatus of a vehicle that is capable of ensuring an effect of reducing a loss by the intermittent voltage step-up control and capable of reducing an electric power loss of a converter.

Solution to Problem

A power supply apparatus of a vehicle according to an aspect of the present invention includes: a power storage device; a voltage step-up converter stepping up a voltage of the power storage device and supplying the stepped-up voltage to a load; an auxiliary machine electrically connected between the power storage device and the voltage step-up converter and driven by means of electric power supplied from the power storage device; and a control device controlling the load based on a required vehicle power including a required charge discharge amount of the power storage device. The control device has a continuous voltage step-up mode and an intermittent voltage step-up mode. In the continuous voltage step-up mode the voltage step-up converter is continuously operated. In the intermittent voltage step-up mode the voltage step-up converter is intermittently operated. In the continuous voltage step-up mode, the control device calculates the required charge discharge amount based on electric power supplied from the power storage device. In the intermittent voltage step-up mode, the control device changes a method of calculating the required charge discharge amount to a method that calculates the required charge discharge amount based on electric power passing through the voltage step-up converter, and makes the required charge discharge amount smaller than the required charge discharge amount in the continuous voltage step-up mode.

In the case where an auxiliary machine is provided between the power storage device and the voltage step-up converter, there arises a difference between the electric power supplied from the power storage device and the electric power supplied to the voltage step-up converter due to the electric power consumed by the auxiliary machine. According to the above-described features, the electric power supplied to the voltage step-up converter is monitored and accordingly the load is controlled in the intermittent voltage step-up mode. Therefore, as compared with the case where the electric power supplied from the power storage device is monitored and accordingly the load is controlled, the current flowing in the voltage step-up converter can be controlled with high precision. Accordingly, in the intermittent voltage step-up mode, an electric power loss of the voltage step-up converter can be reduced.

Preferably, the control device calculates a basic required amount based on a power necessary for travel. In the continuous voltage step-up mode, the control device calculates, as the required charge discharge amount, a correction value determined by correcting the basic required amount so that a difference between the electric power supplied from the power storage device and the basic required amount is reduced. In the intermittent voltage step-up mode, the control device calculates, as the required charge discharge amount, a correction value determined by correcting the basic required amount so that a difference between the electric power passing through the voltage step-up converter and the basic required amount is reduced.

According to the above-described features, the control device calculates, in the intermittent voltage step-up mode, the required charge discharge amount so that the difference between the electric power supplied to the voltage step-up converter and the required charge discharge amount is reduced. Since this control is performed while the electric power supplied to the voltage step-up converter is monitored, the current flowing in the voltage step-up converter is smaller in the case where the required charge discharge amount is reduced (made closer to zero for example). Therefore, an electric power loss of the voltage step-up converter can be reduced. Meanwhile, in the continuous voltage step-up mode, the control device calculates the required charge discharge amount so that the difference between the electric power supplied from the power storage device and the required charge discharge amount is reduced. Since this control is performed while the electric power supplied from the power storage device is monitored, the SOC (State Of Charge) of the power storage device can be managed with higher precision, as compared with the intermittent voltage step-up mode.

Preferably, the control device sets the basic required amount to zero in a case where the power necessary for travel falls within a predetermined range. The predetermined range in the intermittent voltage step-up mode is broader than the predetermined range in the continuous voltage step-up mode.

According to the above-described features, an electric power loss of the voltage step-up converter in the intermittent voltage step-up mode can be reduced to a greater extent for the aforementioned range, as compared with the continuous voltage step-up mode.

Advantageous Effects of Invention

In accordance with the present invention, an effect of reducing a loss by the intermittent voltage step-up control can be ensured and an electric power loss of the converter can be reduced.

DESCRIPTION OF EMBODIMENTS

Embodiments of the present invention will hereinafter be described in detail with reference to the drawings. In the drawings, the same or corresponding parts are denoted by the same reference characters, and a description thereof will not be repeated.

<First Embodiment>

Figure 1:
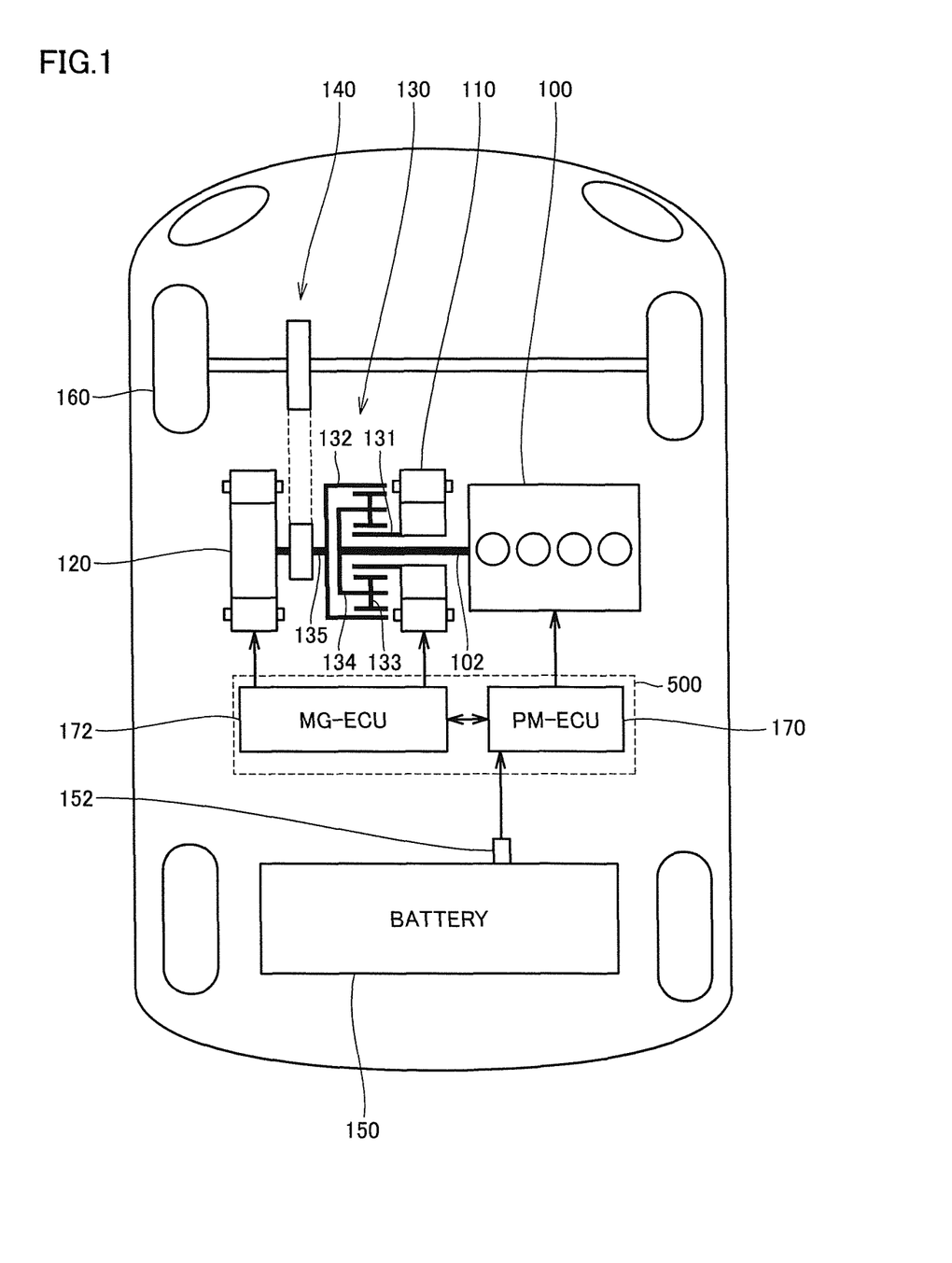
FIG. 1 is a block diagram for illustrating an example configuration of a hybrid vehicle shown as a typical example of the electrically powered vehicle according to a first embodiment of the present invention.

FIG. 1 is a block diagram for illustrating an example configuration of a hybrid vehicle shown as a typical example of the electrically powered vehicle according to a first embodiment of the present invention. Referring to FIG. 1, the hybrid vehicle includes an engine 100, a first MG (Motor Generator) 110, a second MG 120, a power split device 130, a reduction gear 140, a battery 150, drive wheels 160, and a control device 500. Control device 500 is configured to include a PM (Power Management)-ECU (Electronic Control Unit) 170 and an MG-ECU 172.

The hybrid vehicle is caused to travel by a drive force from at least one of engine 100 and second MG 120. Engine 100, first MG 110, and second MG 120 are coupled to each other through power split device 130.

Power split device 130 is typically configured as a planetary gear mechanism. Power split device 130 includes a sun gear 131 which is an externally-toothed gear, a ring gear 132 which is an internally-toothed gear arranged concentrically with sun gear 131, a plurality of pinion gears 133 meshing with sun gear 131 and with ring gear 132, and a carrier 134. Carrier 134 is configured to hold a plurality of pinion gears 133 so that they can rotate on respective axes and also revolve.

Power split device 130 splits motive power generated by engine 100 into two paths. One is a path for driving drive wheels 160 through reduction gear 140. The other is a path for generating electric power by driving first MG 110.

First MG 110 and second MG 120 are each typically a three-phase AC rotating electric machine configured in the form of a permanent-magnet motor.

First MG 110 mainly operates as "electric generator" and is capable of generating electric power from a drive force which is supplied from engine 100 and split by power split device 130. The electric power generated by first MG 110 is used differently depending on the condition in which the vehicle is traveling and the condition of the SOC (State Of Charge) of battery 150. Regarding this electric power, its voltage is thereafter adjusted by a converter, which will be described later herein, and stored in battery 150. In the case for example where engine 100 is motored when the engine is started, first MG 110 can also operate as an electric motor as a result of torque control.

Second MG 120 mainly operates as "electric motor" and is driven by means of at least one of the electric power stored in battery 150 and the electric power generated by first MG 110. The motive power generated by second MG 120 is transmitted to a driveshaft 135 and further transmitted through reduction gear 140 to drive wheels 160. Thus, second MG 120 assists engine 100 or causes the vehicle to travel by the drive force from second MG 120.

When the hybrid vehicle is regeneratively braked, second MG 120 is driven by drive wheels 160 through reduction gear 140. In this case, second MG 120 operates as an electric generator. Thus, second MG 120 serves as a regenerative brake converting braking energy into electric power. The electric power generated by second MG 120 is stored in battery 150.

Battery 150 is a battery pack made up of a plurality of battery modules connected in series, the battery modules each being made up of a plurality of battery cells integrated into the battery module. The voltage of battery 150 is approximately 200 V for example. Battery 150 can be charged with electric power generated by first MG 110 or second MG 120. The temperature, the voltage, and the current of battery 150 are detected by a battery sensor 152. A temperature sensor, a voltage sensor, and a current sensor are herein collectively referred to as battery sensor 152.

PM-ECU 170 and MG-ECU 172 are each configured to have a CPU (Central Processing Unit) and a memory (not shown) incorporated therein, and configured to perform operations based on values detected respectively by the sensors, through software processing in accordance with a map and a program stored in the memory. Alternatively, at least a part of PM-ECU 170 and MG-ECU 172 may be configured to perform a predetermined mathematical operation and/or a predetermined logical operation through hardware processing by a dedicated electronic circuit or the like.

Engine 100 is controlled in accordance with an operational command value from PM-ECU 170. First MG 110, second MG 120, converter 200, and inverters 210, 220 are controlled by MG-ECU 172. PM-ECU 170 and MG-ECU 172 are connected to each other so that they can bidirectionally communicate with each other.

Although PM-ECU 170 and MG-ECU 172 are configured as separate ECUs in the present embodiment, a single ECU incorporating respective functions of these ECUs may be provided.

Figure 2:
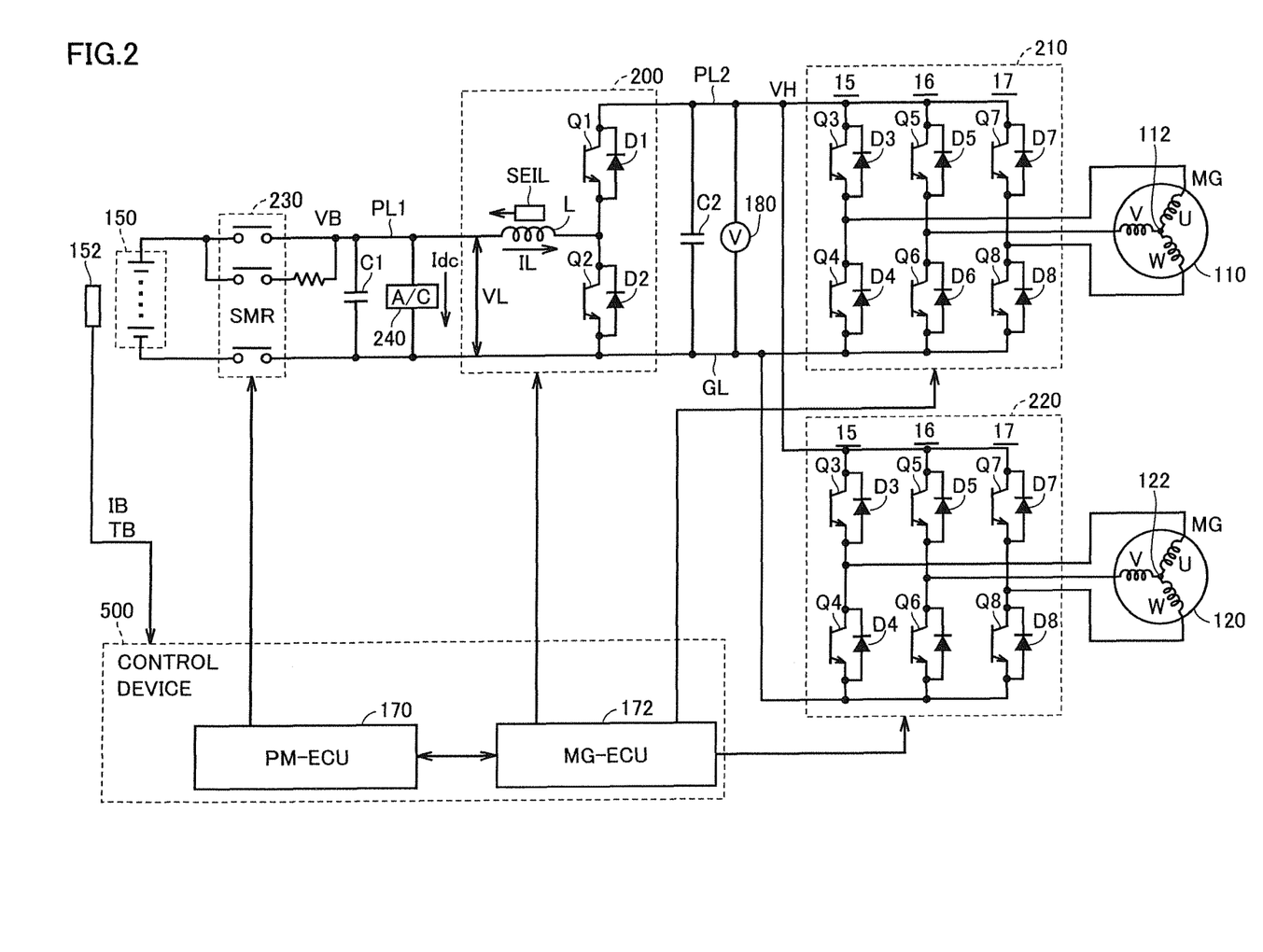
FIG. 2 is a circuit diagram illustrating an example configuration of an electrical system of the hybrid vehicle shown in FIG. 1.

FIG. 2 is a circuit diagram illustrating an example configuration of an electrical system of the hybrid vehicle shown in FIG. 1. Referring to FIG. 2, the electrical system of the hybrid vehicle includes converter 200 (voltage step-up converter), inverter 210 associated with first MG 110, inverter 220 associated with second MG 120, an SMR (System Main Relay) 230, and capacitors C1, C2.

Converter 200 includes two power semiconductor switching elements Q1, Q2 (also referred to simply as "switching element" hereinafter) connected in series, diodes D1, D2 provided in association with switching elements Q1, Q2, respectively, and a reactor L.

Switching elements Q1, Q2 are connected in series between a positive line PL2 and a ground line GL which is connected to a negative electrode of battery 150. The collector of switching element Q1 is connected to positive line PL2 and the emitter of switching element Q2 is connected to ground line GL. Diodes D1, D2 are connected in anti-parallel with switching elements Q1, Q2, respectively. Switching element Q1 and diode D1 constitute an upper arm of converter 200 and switching element Q2 and diode D2 constitute a lower arm of converter 200.

As power semiconductor switching elements Q1, Q2, any of IGBT (Insulated Gate Bipolar Transistor), power MOS (Metal Oxide Semiconductor) transistor, power bipolar transistor and the like can appropriately be used. ON/OFF of each of switching elements Q1, Q2 is controlled by a switching control signal from MG-ECU 172.

Reactor L has one end connected to a positive line PL1 which is connected to a positive electrode of battery 150, and the other end connected to a connection node of switching elements Q1, Q2, namely a connection point between the emitter of switching element Q1 and the collector of switching element Q2.

Capacitor C2 is connected between positive line PL2 and ground line GL. Capacitor C2 smoothes an AC component of a voltage variation between positive line PL2 and ground line GL. Capacitor C1 is connected between positive line PL1 and ground line GL. Capacitor C1 smoothes an AC component of a voltage variation between positive line PL1 and ground line GL.

Further, an air conditioner (A/C) 240 is connected between positive line PL1 and ground line GL. Although not shown, auxiliary machines other than air conditioner 240 may also be connected between positive line PL1 and ground line GL. Current supplied to air conditioner 240 and current supplied to the auxiliary machine are collectively expressed as auxiliary machine current Idc. It should be noted that air conditioner 240 and other auxiliary machines all correspond to "auxiliary machine."

Current IL flowing in reactor L (hereinafter also referred to as reactor current) is detected by a current sensor SEIL. A voltage VL of reactor L (hereinafter also referred to as reactor voltage) relative to the voltage of ground line GL is identical to battery voltage VB in the present embodiment and is therefore detected by battery sensor 152. It should be noted that a sensor for detecting reactor voltage VL may separately be provided.

A voltage sensor 180 detects a voltage across terminals of capacitor C2 that is an output voltage of converter 200, namely detects a voltage VH (system voltage) between positive line PL2 and ground line GL, and outputs the detected value to MG-ECU 172.

Converter 200, inverter 210, and inverter 220 are electrically connected to each other through positive line PL2 and ground line GL.

In a voltage step-up operation, converter 200 steps up a DC voltage VB (voltage across the opposite terminals of capacitor C1) that is supplied from battery 150, and supplies system voltage VH generated by the voltage step-up to inverters 210, 220. More specifically, in response to a switching control signal from MG-ECU 172, an ON period of switching element Q1 and an ON period of switching element Q2 are alternated, and a voltage step-up ratio is determined depending on a ratio between these ON periods.

In a voltage step-down operation, converter 200 steps down system voltage VH which is supplied through capacitor C2 from inverters 210, 220 to charge battery 150 with the voltage. More specifically, in response to a switching control signal from MG-ECU 172, a period in which only switching element Q1 is ON and a period in which both switching elements Q1, Q2 are OFF are alternated, and a voltage step-down ratio is determined depending on the duty ratio of the ON period.

When the voltage step-up/step-down operation of converter 200 is stopped, switching element Q1 is fixed in an ON state and switching element Q2 is fixed in an OFF state.

Inverter 210 is configured in the form of a common three-phase inverter, and includes a U phase arm 15, a V phase arm 16, and a W phase arm 17. Arms 15 to 17 include switching elements Q3 to Q8 and anti-parallel diodes D3 to D8.

When the vehicle is traveling, inverter 210 controls current or voltage of each phase coil of first MG 110 so that first MG 110 operates in accordance with an operational command value (typically torque command value) which is set for generating a drive force (vehicle drive torque, electric power generation torque, or the like) required for the vehicle to travel. Namely, inverter 210 performs bidirectional DC/AC power conversion between positive line PL2 and first MG 110.

Inverter 220 is configured in the form of a common three-phase inverter, like inverter 210. When the vehicle is traveling, inverter 220 controls current or voltage of each phase coil of second MG 120 so that second MG 120 operates in accordance with an operational command value (typically torque command value) which is set for generating a drive force (vehicle drive torque, regenerative braking torque, or the like) required for the vehicle to travel. Namely, inverter 220 performs bidirectional DC/AC power conversion between positive line PL2 and second MG 120.

PM-ECU 170 calculates a torque command value TR1 for first MG 110 and a torque command value TR2 for second MG 120, based on an accelerator pedal position Acc and a speed V of the hybrid vehicle.

MG-ECU 172 calculates an optimum value (target value) of output voltage (system voltage) VH of converter 200, namely a command voltage VH*, based on torque command value TR1 for first MG 110 and torque command value TR2 for second MG 120 that are calculated by PM-ECU 170 as well as a motor rotational speed MRN1 of first MG 110 and a motor rotational speed MRN2 of second MG 120. MG-ECU 172 calculates, based on output voltage VH of converter 200 that is detected by voltage sensor 180 and command voltage VH*, a duty ratio for controlling output voltage VH so that voltage VH is equal to command voltage VH*, and accordingly controls converter 200. It should be noted that inverters 210, 220, first MG 110, and second MG 120 correspond to "load."

MG-ECU 172 controls converter 200 by setting the converter in one of a continuous voltage step-up mode and an intermittent voltage step-up mode. The continuous voltage step-up mode is a mode in which converter 200 performs a voltage step-up operation without stopping. The intermittent voltage step-up mode is a mode in which converter 200 intermittently repeats a voltage step-up operation and stoppage of the voltage step-up operation. When converter 200 performs the voltage step-up operation, switching elements Q1, Q2 are switched between an ON state and an OFF state. When converter 200 stops the voltage step-up operation, switching element Q1 is fixed in the ON state and switching element Q2 is fixed in the OFF state.

The fact that converter 200 does not step up the voltage in the continuous voltage step-up mode and the fact that converter 200 stops voltage step-up in the intermittent voltage step-up mode are different from each other in terms of the following respect.

In the continuous voltage step-up mode, the voltage of battery 150 is supplied to inverters 210, 220 through converter 200. Therefore, in the case where converter 200 does not step up the voltage in the continuous voltage step-up mode, the voltage of battery 150 is supplied as it is through converter 200 (duty ratio is 1) to inverters 210, 220 without being stepped up.

In contrast, when converter 200 stops voltage step-up in the intermittent voltage step-up mode, the voltage of battery 150 is not supplied through converter 200 to inverters 210, 220.

Figure 3:
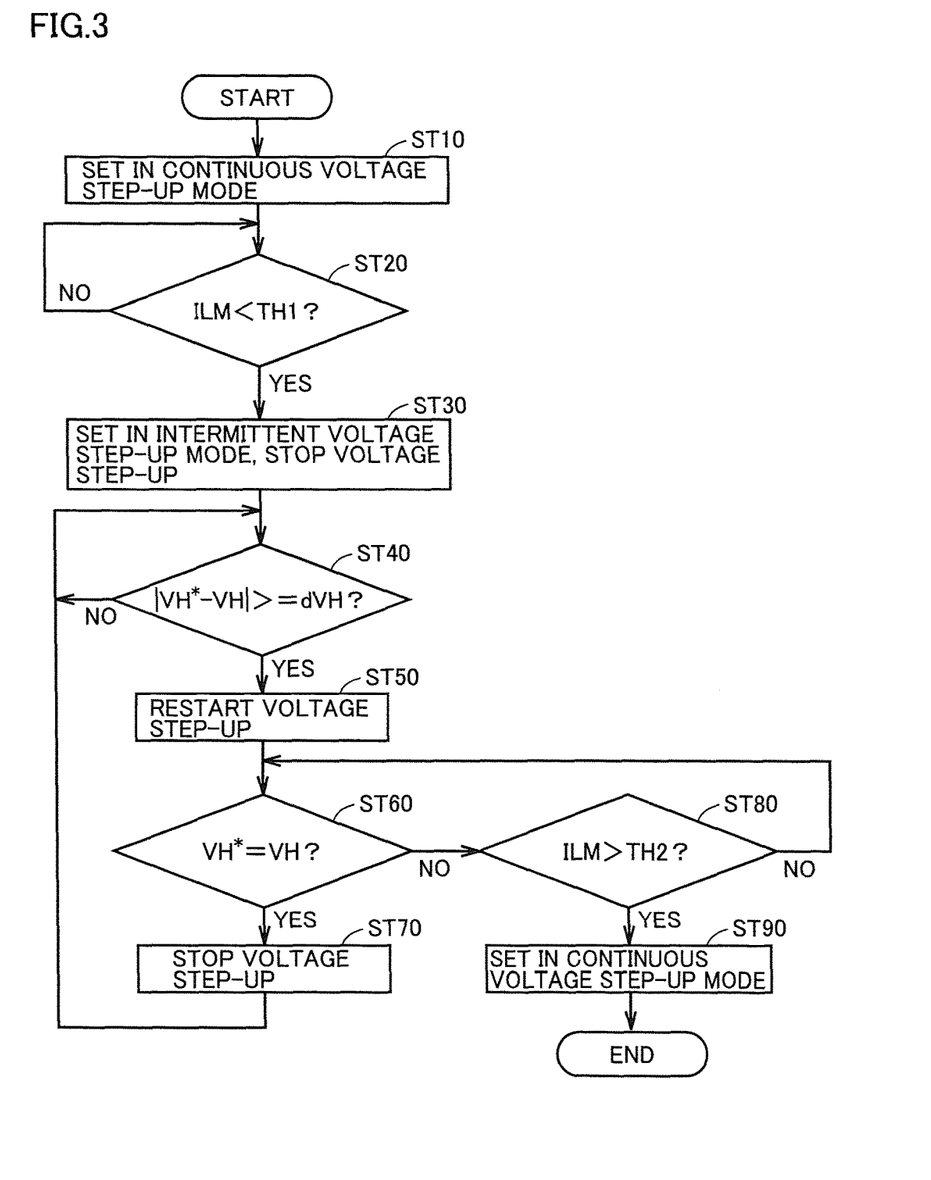
FIG. 3 is a flowchart showing a procedure of voltage step-up control by a converter 200.
Figure 4:
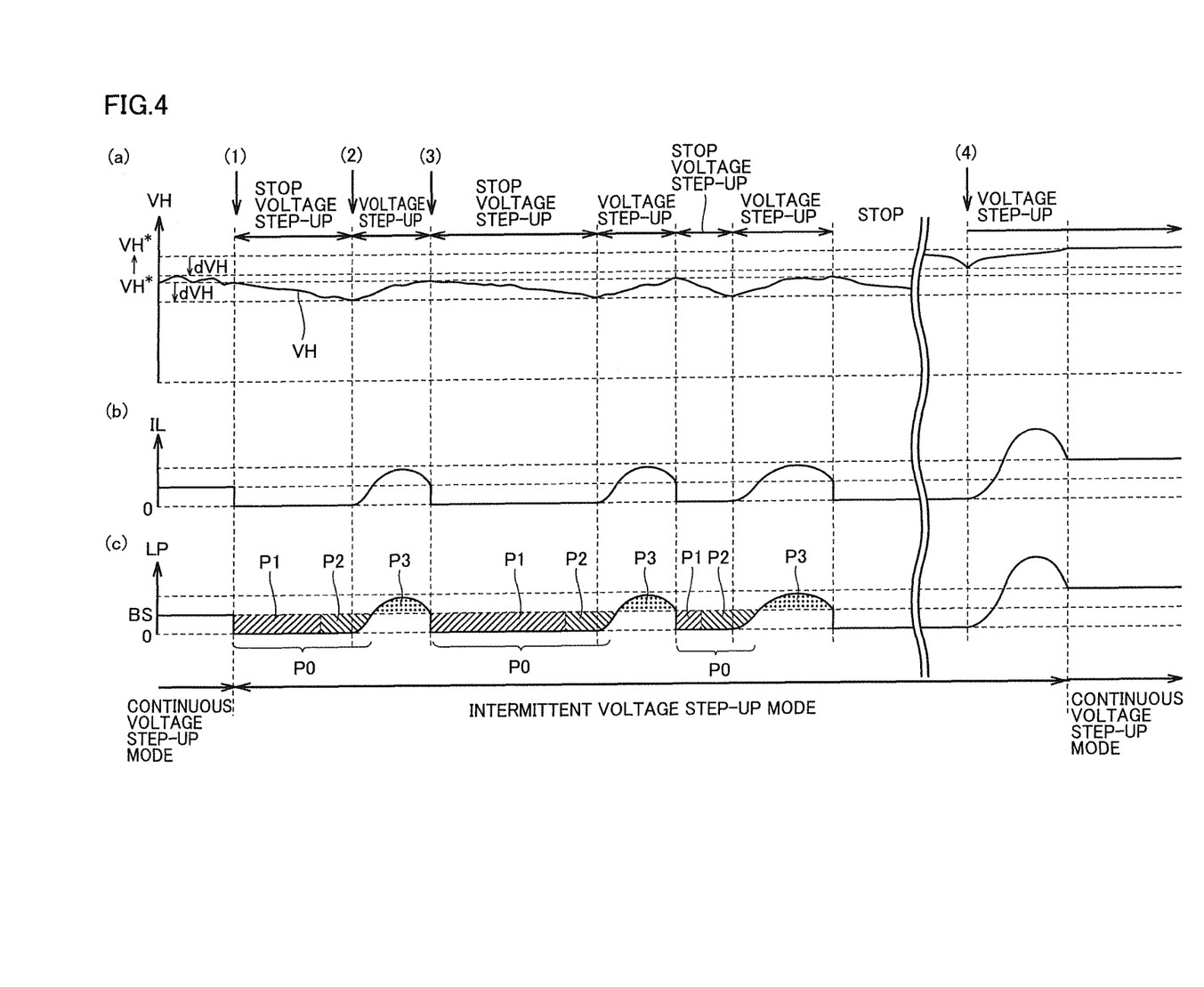
FIG. 4 is a waveform diagram for illustrating operations in a continuous voltage step-up mode and an intermittent voltage step-up mode.

FIG. 3 is a flowchart showing a procedure of voltage step-up control by converter 200. FIG. 4 is a waveform diagram for illustrating operations in the continuous voltage step-up mode and the intermittent voltage step-up mode.

FIG. 4 (a) is a chart showing output voltage (system voltage) VH of converter 200 in the continuous voltage step-up mode and the intermittent voltage step-up mode. FIG. 4 (b) is a chart showing reactor current IL in the continuous voltage step-up mode and the intermittent voltage step-up mode. Although reactor current IL is actually caused to vary by switching of converter 200, FIG. 4 (b) shows the reactor current whose varying component due to switching is smoothed. FIG. 4 (c) is a chart showing a voltage step-up power loss LP due to switching in the continuous voltage step-up mode and the intermittent voltage step-up mode.

Referring to FIGS. 2 and 3, in step ST10, control device 500 sets converter 200 in the continuous voltage step-up mode. Converter 200 performs the voltage step-up operation without stopping the voltage step-up operation.

After this, when an average ILM of reactor current IL in a predetermined period in the past is less than a threshold value TH1 in step ST20, control device 500 causes the process to proceed to step ST30.

In step ST30, control device 500 sets converter 200 in the intermittent voltage step-up mode. In the case where the converter is set in the intermittent voltage step-up mode, control device 500 first causes the voltage step-up operation of converter 200 to be stopped (see time (1) in FIG. 4 for example).

When the voltage step-up operation of converter 200 is stopped, current is not output from battery 150. Therefore, reactor current IL is zero and voltage step-up power loss LP is zero. While the voltage step-up operation of converter 200 is stopped, first MG 110 and/or second MG 120 are/is driven with electric power stored in capacitor C2. As electrical charge is discharged from capacitor C2, system voltage VH is decreased.

After this, when a deviation |VH*−VH| between system voltage VH and command voltage VH* is equal to or more than a limit value dVH in step ST40, control device 500 causes the process to proceed to step ST50. In step ST50, control device 500 causes converter 200 to restart the voltage step-up operation (see time (2) in FIG. 4 for example).

When the voltage step-up operation by converter 200 is restarted, battery 150 supplies current (recovery current) which is necessary to drive first MG 110 and/or second MG 120 while charging capacitor C2. Therefore, reactor current IL is increased and voltage step-up power loss LP is increased.

After this, when system voltage VH is equal to command voltage VH* in step ST60, control device 500 causes the process to proceed to step ST70. In step ST70, control device 500 causes the voltage step-up operation by converter 200 to be stopped (see time (3) in FIG. 4 for example). Following step ST70, the process is performed again from step ST40.

In contrast, when system voltage VH is not equal to command voltage VH* in step ST60, control device 500 causes the process to proceed to step ST80. When average ILM of reactor current IL in a predetermined period in the past is larger than a threshold value TH2 in step ST80, control device 500 causes the process to proceed to step ST90 to set converter 200 in the continuous voltage step-up mode. Converter 200 performs the voltage step-up operation without stopping (see time (4) in FIG. 4 for example). At time (4) in FIG. 4, it is shown that command voltage VH* has been increased and reactor current IL begins to increase. After step ST90 is performed, the series of the process steps is ended.

FIG. 4 (c) shows by what amount voltage step-up power loss LP is reduced in a set of one period in which voltage step-up is stopped and one subsequent period in which voltage step-up is performed, in the intermittent voltage step-up mode. An area P3 of a region enclosed by a line which represents a reference power loss BS and a line which represents voltage step-up power loss LP and is located higher than the line of reference power loss BS is the sum of voltage step-up power losses LP larger than the voltage step-up power loss in the continuous voltage step-up mode. An area P0 of a region enclosed by the line which represents reference power loss BS and the line which represents voltage step-up power loss LP and is located lower than the line of reference power loss BS is the sum of voltage step-up power losses LP smaller than the voltage step-up power loss in the continuous voltage step-up mode. A value P1 determined by subtracting P2 (=P3) from P0 is the sum of reductions of the voltage step-up power loss, relative to the voltage step-up power loss in the continuous voltage step-up mode, achieved by the operation in the intermittent voltage step-up mode in the set of one period in which voltage step-up is stopped and one subsequent period in which voltage step-up is performed.

As shown in FIG. 4 (c), converter 200 can be set in the intermittent voltage step-up mode to thereby reduce the voltage step-up power loss. A longer period in which the voltage step-up is stopped produces a greater effect of reducing the loss.

Next, how to calculate a required charge discharge amount Pchg will be described. Generally, PM-ECU 170 determines required charge discharge amount Pchg of battery 150 based on, for example, travel power, required drive force, or torque. Further, PM-ECU 170 calculates a required vehicle power Pe including this required charge discharge amount Pchg. Engine 100, first MG 110, and second MG 120 are controlled based on required vehicle power Pe.

In contrast, PM-ECU 170 in the present embodiment first determines a basic required amount Pchg0 of battery 150, instead of required charge discharge amount Pchg. Then, PM-ECU 170 determines required charge discharge amount Pchg by correcting basic required amount Pchg0. In the following, a description will be given of the case where basic required amount Pchg0 is calculated based on a travel power Tp*.

Figure 5:
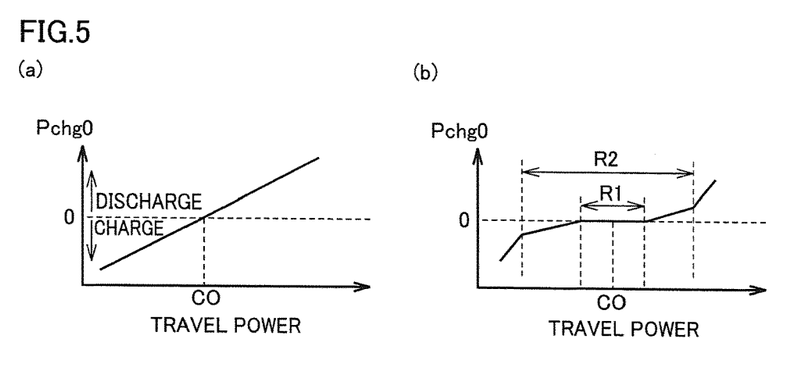
FIG. 5 is a diagram showing maps defining in advance a relationship between a travel power and a required charge discharge amount Pchg.

FIG. 5 is a diagram showing maps defining in advance a relationship between travel power Tp* and basic required amount Pchg0. FIG. 5 (a) is a chart showing an example of a first map. When discharging is required, basic required amount Pchg0 is positive. When charging is required, basic required amount Pchg0 is negative.

In the first map, with respect to a control center CO, the greater the travel power Tp*, the greater the basic required amount Pchg0 (required discharge amount). Also, with respect to control center CO, the smaller the travel power Tp*, the smaller the basic required amount Pchg0 (the greater the required charge amount). The amount of change of basic required amount Pchg0 relative to travel power Tp* is a constant value K.

FIG. 5 (b) is a chart showing an example of a second map. In the second map, basic required amount Pchg0 is zero in a specific range R1 of travel power Tp* that includes control center CO. In a range where travel power Tp* is greater than specific range R1, the greater the travel power Tp*, the greater the basic required amount Pchg0 (required discharge amount). In a range where travel power Tp* is smaller than specific range R1, the smaller the travel power Tp*, the smaller the basic required amount Pchg0 (the greater the required charge amount). The amount of change of basic required amount Pchg0 relative to travel power Tp* in a specific range R2 including control center CO is smaller than specific value K in the first map. It should be noted that R2 is a range including R1, and the amount of change of basic required amount Pchg0 relative to travel power Tp* in R1 is zero.

Thus, in the case where travel power Tp* falls in a "predetermined range," control device 500 sets basic required amount Pchg0 to zero. Specific range R1 shown in FIG. 5 (b) corresponds to "predetermined range." In contrast, FIG. 5 (a) shows that basic required amount Pchg0 is zero at a "value" of control center CO, not in a "range." However, "predetermined range" herein includes such "value."

MG-ECU 172 transmits to PM-ECU 170 a flag for PM-ECU 170 to select one of the first and second maps. In the case where the flag is ON, PM-ECU 170 selects the second map. In the case where the flag is OFF, PM-ECU 170 selects the first map.

In the case where the current state of the hybrid vehicle is the intermittent voltage step-up mode and the ratio of the length of a period for which voltage step-up is stopped to a most recent predetermined period (from a few seconds ago to the present for example) is a predetermined value Tc or more, it is assumed that the ratio of the period in which converter 200 is stopped will also be high in the future. In this case, therefore, it is desirable to make basic required amount Pchg0 smaller. This is for the following reason. If basic required amount Pchg0 is larger in such a state, there is a higher probability that converter 200 restarts voltage step-up and accordingly an electric power loss of the intermittent voltage step-up control cannot be reduced. Therefore, MG-ECU 172 sets the flag ON that is to be transmitted to PM-ECU 170. Accordingly, the second map is selected.

In contrast, in the case where the current state of the hybrid vehicle is the continuous voltage step-up mode, or in the case where the current state of the hybrid vehicle is the intermittent voltage step-up mode and the ratio of the length of a period for which voltage step-up is stopped to a most recent predetermined period is less than predetermined value Tc, MG-ECU 172 sets the flag OFF that is to be transmitted to PM-ECU 170. Accordingly, the first map is selected.

Thus, control device 500 uses, as required charge discharge amount Pchg before corrected, basic required amount Pchg0 which is determined based on the power required for the vehicle to travel. In the intermittent voltage step-up mode (see FIG. 5 (b)), control device 500 sets basic required amount Pchg0 to zero over a broader range of power required for the vehicle to travel, as compared with the continuous voltage step-up mode (see FIG. 5 (a)).

Figure 6:
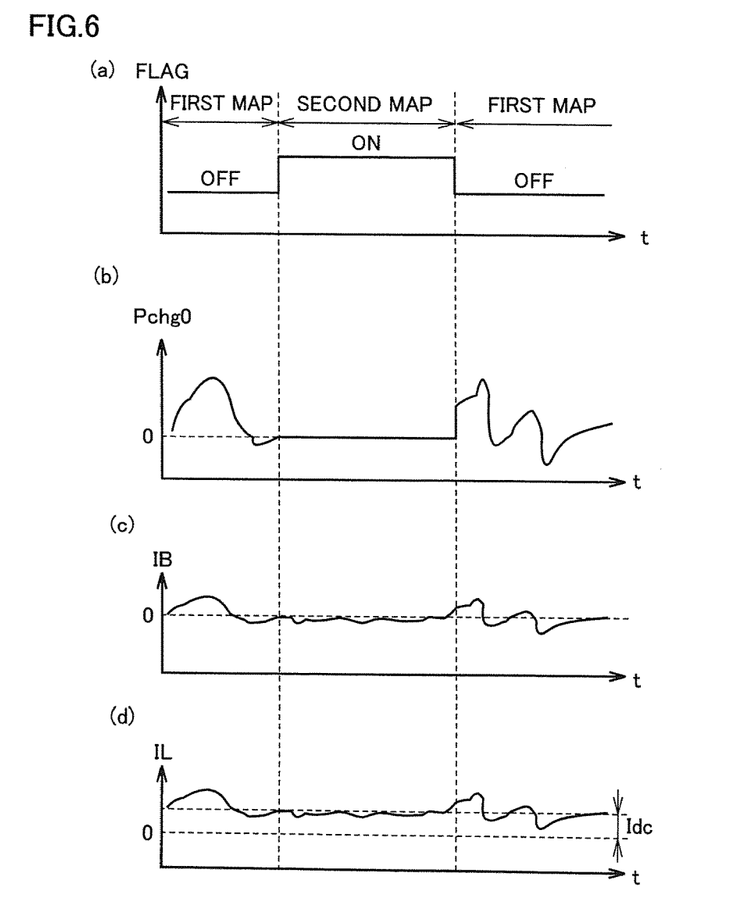
FIG. 6 is a diagram showing a relationship between a flag, a basic required amount Pchg0, a battery current IB, and a reactor current IL.

FIG. 6 is a diagram showing a relationship between the flag transmitted by MG-ECU 172, basic required amount Pchg0, battery current IB, and reactor current IL. FIG. 6 (a) shows the flag, FIG. 6 (b) shows basic required amount Pchg0, FIG. 6 (c) shows battery current IB, and FIG. 6 (d) shows reactor current IL. Although reactor current IL is actually caused to vary by switching of converter 200, FIG. 6 (d) shows the reactor current whose varying component due to switching is smoothed.

As shown in FIG. 6 (a), in the case where the flag is OFF, PM-ECU 170 determines basic required amount Pchg0 corresponding to travel power Tp*, in accordance with the first map. In contrast, in the case where the flag is ON, PM-ECU 170 determines basic required amount Pchg0 corresponding to travel power Tp*, in accordance with the second map.

If travel power Tp* in the second map is in the range of R1, basic required amount Pchg0 is zero as shown in FIG. 6 (b). In the case where basic required amount Pchg0 is zero, no current is output from battery 150 and no current is input to battery 150. Battery current IB is therefore zero (see FIG. 6 (c)). If reactor current IL is also zero in the case where battery current IB is zero, an electric power loss of converter 200 can significantly be reduced. This is for the reason that the smaller the absolute value of reactor current IL, the longer the period for which switching elements Q1, Q2 can be OFF in a voltage step-up period.

A more specific description of this is as follows. While switching elements Q1, Q2 are ON, a reactor current IL of approximately a few amperes, for example, may flow. Therefore, if the extent to which the voltage is stepped up by converter 200 is large, the electric power loss is large to a non-negligible extent. In contrast, in the case where reactor current IL is zero, switching elements Q1, Q2 can be kept OFF while reactor current IL is zero, and therefore, the electric power loss of converter 200 can significantly be reduced.

In the present embodiment, however, auxiliary machines such as air conditioner 240 are connected between battery 150 and converter 200 (see FIG. 2). These auxiliary machines are driven by consuming auxiliary machine current Idc. Between battery current IB, reactor current IL, and auxiliary machine current Idc, a relation: IB=IL+Idc holds. Therefore, even in the case where battery current IB is zero, reactor current IL will never be zero as long as the auxiliary machines consume the electric power (see FIG. 6 (d)).

Travel control for an electrically powered vehicle in the embodiment of the present invention will be described in detail in the following.

Figure 7:
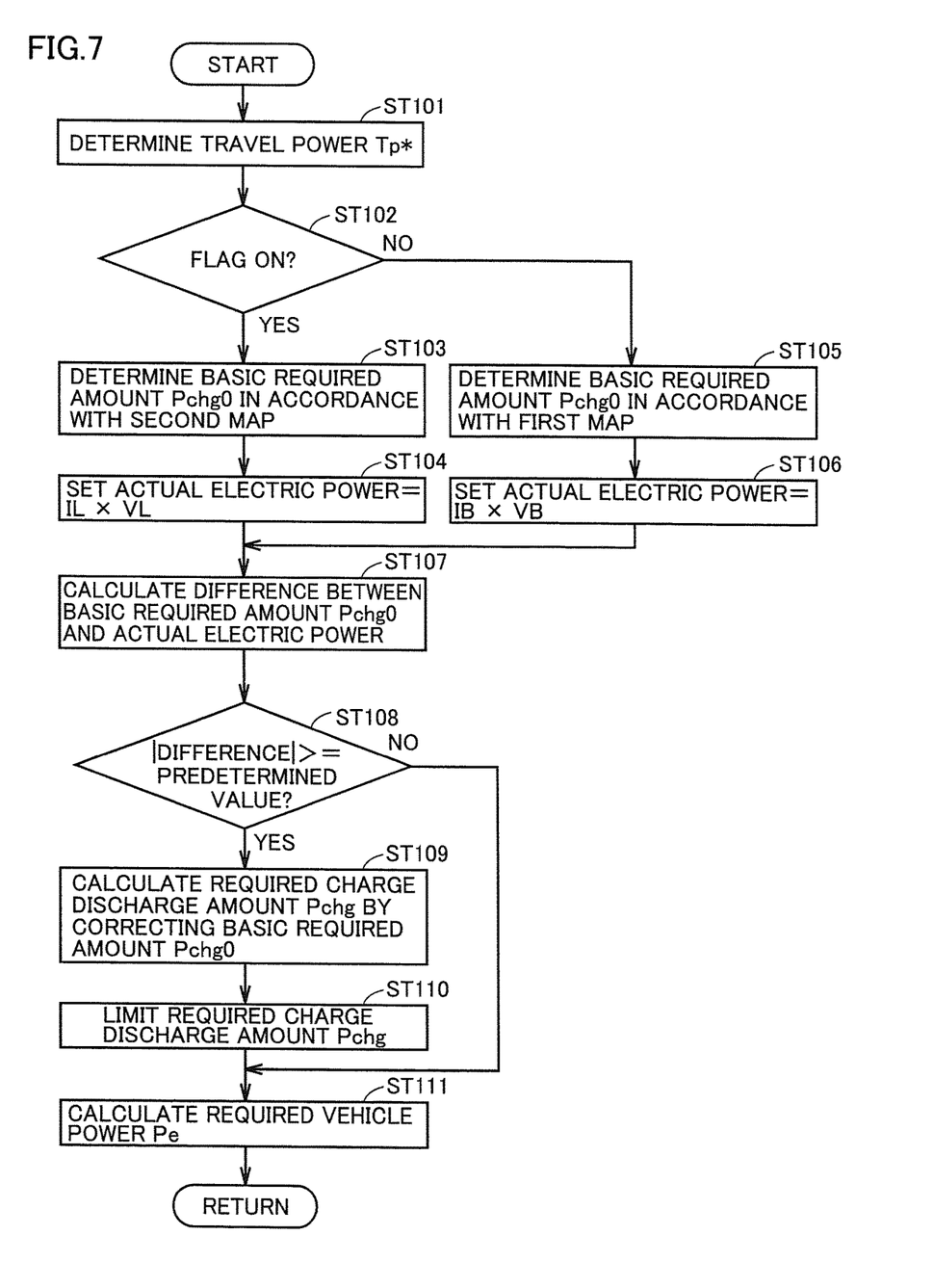
FIG. 7 is a flowchart showing a procedure of travel control in the first embodiment of the present invention.
Figure 8:
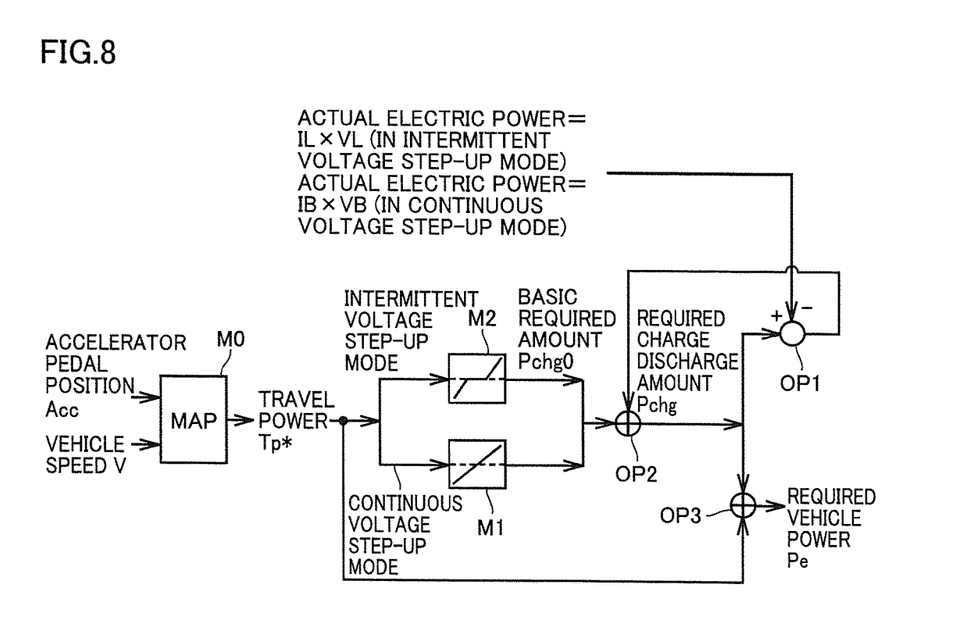
FIG. 8 is a conceptual diagram for illustrating the travel control in the first embodiment of the present invention.

FIG. 7 is a flowchart showing a procedure of the travel control in the first embodiment of the present invention. FIG. 8 is a conceptual diagram for illustrating the travel control in the first embodiment of the present invention. A control process following the flowchart shown in FIG. 7 is performed by PM-ECU 170 and MG-ECU 172 for every predetermined control cycles or when a predetermined condition is met, for example.

Referring to FIGS. 7 and 8, in step ST101, PM-ECU 170 has stored in the memory a map M0 which defines in advance a relationship of an accelerator pedal position Acc and a vehicle speed V of a hybrid vehicle, with a travel power Tp*. In response to detection of accelerator pedal position Acc and vehicle speed V, PM-ECU 170 refers to map M0 to thereby determine travel power Tp*.

In the case where the flag is ON in step ST102 (YES in step ST102), PM-ECU 170 causes the process to proceed to step ST103. Namely, in the case where the current state of the hybrid vehicle is the intermittent voltage step-up mode and the ratio of the length of a period for which voltage step-up is stopped to a most recent predetermined period is predetermine value Tc or more, the process is caused to proceed to step ST103.

In step ST103, PM-ECU 170 determines basic required amount Pchg0 in accordance with a second map M2 (see FIG. 5 (b)), based on travel power Tp* determined in step ST101. Next, in step ST104, PM-ECU 170 sets the actual electric power to the electric power supplied to converter 200 (namely the product of reactor voltage VL and reactor current IL). After this, PM-ECU 170 causes the process to proceed to step ST107.

In contrast, in the case where the flag is OFF in step ST102 (NO in step ST102), PM-ECU 170 causes the process to proceed to step ST105. Namely, in the case for example where the current state of the hybrid vehicle is the continuous voltage step-up mode, the process is caused to proceed to step ST105.

In step ST105, PM-ECU 170 determines basic required amount Pchg0 in accordance with a first map M1 (see FIG. 5 (a)), based on travel power Tp* determined in step ST101. Next, in step ST106, PM-ECU 170 sets the actual electric power to the electric power supplied from battery 150 (namely the product of battery voltage VB and battery current IB). After this, PM-ECU 170 causes the process to proceed to step ST107.

In step ST107, PM-ECU 170 calculates a difference between basic required amount Pchg0 and the actual electric power (see OP1 in FIG. 8). After this, PM-ECU 170 causes the process to proceed to step ST108.

In step ST108, PM-ECU 170 determines whether or not an absolute value of the difference calculated in step ST107 is equal to or more than a predetermined value (0.5 kW for example). In the case where the absolute value is less than the predetermined value (NO in step ST108), PM-ECU 170 causes the process to proceed to step ST111. In contrast, in the case where the absolute value is equal to or more than the predetermined value (YES in step ST108), PM-ECU 170 causes the process to proceed to step ST109.

In step ST109, PM-ECU 170 corrects basic required amount Pchg0 so that basic required amount Pchg0 is equal to the actual electric power, and defines this corrected basic required amount Pchg0 as required charge discharge amount Pchg (see OP2 in FIG. 8). Therefore, in the case where step ST104 is performed, required charge discharge amount Pchg is equal to the electric power (=IL×VL) supplied to converter 200. In contrast, in the case where step ST106 is performed, required charge discharge amount Pchg is equal to the electric power (=IB×VB) supplied from battery 150.

In other words, in the continuous voltage step-up mode, PM-ECU 170 calculates required charge discharge amount Pchg based on the electric power supplied from battery 150. In the intermittent voltage step-up mode, PM-ECU 170 changes the method of calculating required charge discharge amount Pchg to a method that calculates required charge discharge amount Pchg based on the electric power passing through converter 200, and makes required charge discharge amount Pchg smaller than that in the continuous voltage step-up mode. More preferably, in the continuous voltage step-up mode, PM-ECU 170 calculates, as required charge discharge amount Pchg, a correction value determined by correcting basic required amount Pchg0 so that a difference between the electric power supplied from battery 150 and basic required amount Pchg0 is reduced. In contrast, in the intermittent voltage step-up mode, PM-ECU 170 calculates, as required charge discharge amount Pchg, a correction value determined by correcting basic required amount Pchg0 so that a difference between the electric power passing through converter 200 and basic required amount Pchg0 is reduced.

In step ST110, PM-ECU 170 imposes a certain limitation on corrected basic required amount Pchg0 (namely required charge discharge amount Pchg) calculated in step ST109. This is for the following reason. In the case where original basic required amount Pchg0 and corrected basic required amount Pchg0 are greatly different from each other, this correction may be accompanied by a sudden change of the state of the hybrid vehicle. By way of example, a command value for engine 100 may be significantly increased to cause the rotational speed of engine 100 to suddenly increase. In this case, a user may feel this is abnormal. Thus, when required charge discharge amount Pchg is calculated, it is desirable to impose a limitation so that the difference between original basic required amount Pchg0 and corrected basic required amount Pchg0 does not exceed a specific range. Accordingly, a sudden change of the state of the hybrid vehicle can be suppressed.

In step ST111, PM-ECU 170 calculates required vehicle power Pe by adding together travel power Tp* and required charge discharge amount Pchg (see OP3 in FIG. 8). In accordance with required vehicle power Pe, PM-ECU 170 determines the share of power so that the energy efficiency of the vehicle as a whole is a maximum efficiency. Accordingly, the shares of the output to be undertaken by engine 100, first MG 110, and second MG 120, respectively, are determined. After this, the series of process steps shown in FIG. 7 is repeated for every predetermined control cycles or when a predetermined condition is met.

The reason why step ST108 is provided is as follows. The difference between basic required amount Pchg0 and the actual electric power may vary to a certain degree. Therefore, if basic required amount Pchg0 is corrected so that this difference is zero all the time, the state in which engine 100, first MG 110, and/or second MG 120 are/is driven may be varied frequently. Thus, in order to define a range serving as a so-called dead zone, a predetermined value is determined. Only in the case where the absolute value of the aforementioned difference is the predetermined value or more, basic required amount Pchg0 can be corrected to thereby prevent the state in which engine 100 and the like is driven from frequently varying.

As seen from the foregoing, in the intermittent voltage step-up mode, a voltage step-up period (the period between (2) and (3) in FIG. 4 for example) and a voltage step-up stoppage period (the period between (1) and (2) in FIG. 4 for example) are alternated repeatedly. In the voltage step-up stoppage period, it is desirable to set the current (namely reactor current IL) flowing in switching elements Q1, Q2 to zero, in order to reduce an electric power loss of switching elements Q1, Q2. If air conditioner 240 and the like is connected between battery 150 and converter 200, however, reactor current IL cannot be set to zero by the control performed so that battery current IB is zero.

According to the present embodiment, in the intermittent voltage step-up mode, the actual electric power is calculated based on reactor current IL (see step ST104). Namely, required charge discharge amount Pchg is determined based on the electric power passing through converter 200. Thus, when required charge discharge amount Pchg is zero in a voltage step-up stoppage period, the electric current (reactor current IL) passing through converter 200 can be made zero. Accordingly, an electric power loss of converter 200 can be reduced.

In contrast, in the continuous voltage step-up mode, the actual electric power is calculated based on battery current IB (see step ST106). Namely, required charge discharge amount Pchg is determined based on the electric power supplied from battery 150. In the continuous voltage step-up mode, there is no period corresponding to the voltage step-up stoppage period in the intermittent voltage step-up mode, and therefore, it is unnecessary to make the current passing through converter 200 zero. It is rather desirable to calculate the actual electric power based on battery current IB, since this enables precise management of the SOC of battery 150.

Although PM-ECU 170 determines basic required amount Pchg0 based on travel power Tp* in steps ST103, ST105, determined basic required amount Pchg0 may be corrected based on the SOC of battery 150. For example, when the SOC of battery 150 has reached a predetermined lower limit, PM-ECU 170 may decrease basic required amount Pchg0 and, when the SOC of battery 150 has reached a predetermined upper limit, PM-ECU 170 may increase basic required amount Pchg0.

Further, although the present embodiment makes basic required amount Pchg0 smaller in the case where the mode is the intermittent voltage step-up mode and the ratio of a period for which voltage step-up by the converter is stopped to a most recent predetermined period is high (see FIG. 5(b)), the embodiment is not limited to this. In the intermittent voltage step-up mode, basic required amount Pchg0 may be made smaller than that in the continuous voltage step-up mode, without depending on other conditions.

<Second Embodiment>

In a second embodiment, required charge discharge amount Pchg in the continuous voltage step-up mode is corrected. A hybrid vehicle and an electrical system in the second embodiment have respective configurations equivalent to the configurations in the first embodiment (see FIGS. 1 and 2). Therefore, the description thereof will not be repeated.

Figure 9:
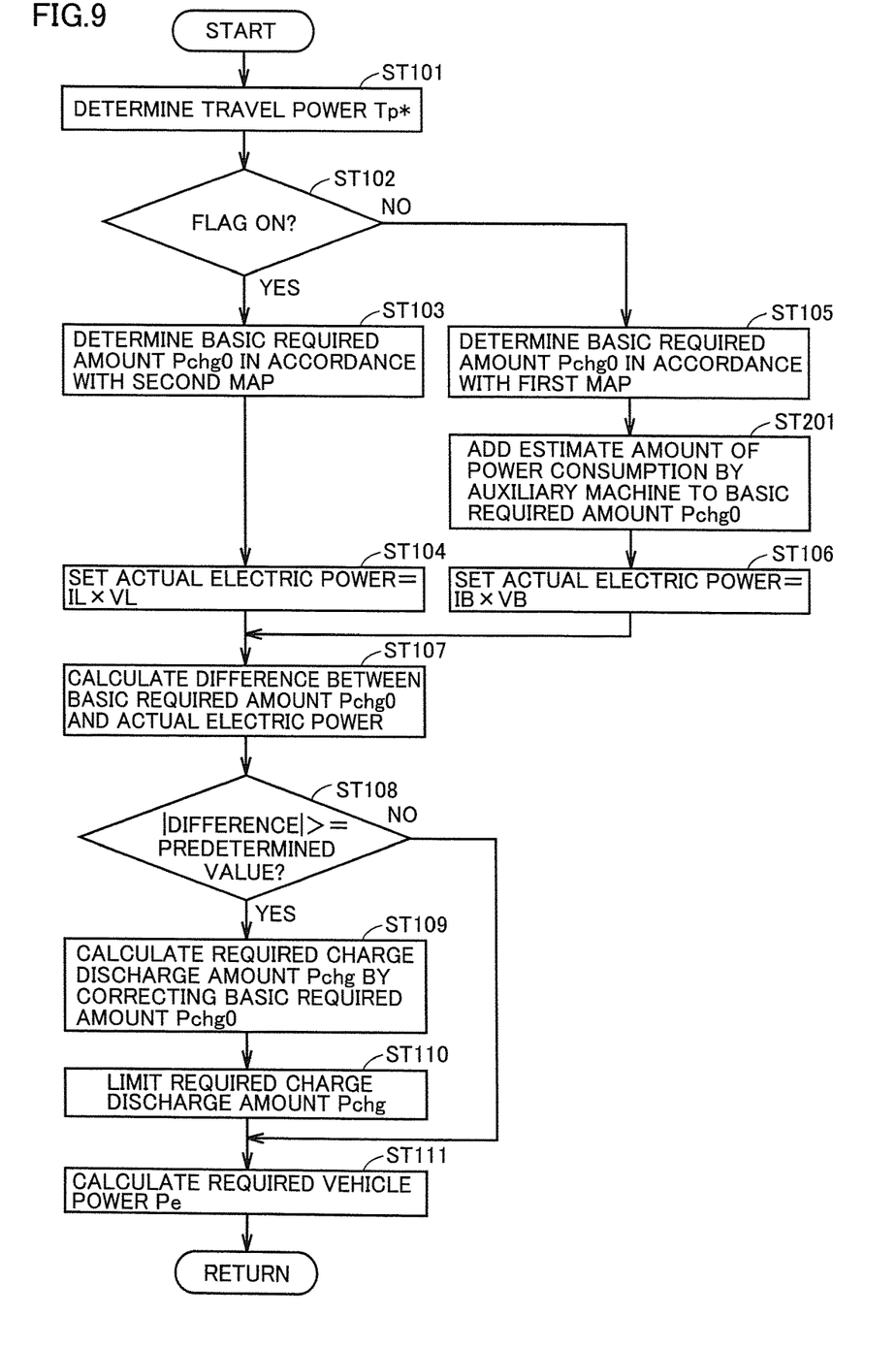
FIG. 9 is a flowchart showing a procedure of travel control in a second embodiment of the present invention.

FIG. 9 is a flowchart showing a procedure of travel control in the second embodiment of the present invention. Referring to FIG. 9, this flowchart is different from the flowchart shown in FIG. 7 in that the former includes step ST201 between step ST105 and step ST106.

In step ST201, PM-ECU 170 adds, in the continuous voltage step-up mode, an estimate amount of power consumption by auxiliary machines such as air conditioner 240, to basic required amount Pchg0 determined in step ST105. This estimate amount can be stored in advance, in the form of a map (not shown) for a variety of conditions, in the memory.

In the continuous voltage step-up mode, the electric power supplied from battery 150 is set as the actual electric power as described above (see step ST106). Because a part of the electric power supplied from battery 150 is consumed by auxiliary machines such as air conditioner 240, the actual electric power includes the electric power consumed by air conditioner 240 and the like and the electric power supplied to converter 200.

In the second embodiment, an estimate amount of power consumption by air conditioner 240 and the like is added to basic required amount Pchg0. In this way, basic required amount Pchg0 is determined in consideration of the power consumption by air conditioner 240 and the like, and therefore, both the actual electric power and basic required amount Pchg0 include the power consumption by air conditioner 240 and the like. Thus, when the difference between basic required amount Pchg0 and the actual electric power is calculated (see step ST107), the influence of the power consumption by air conditioner 240 and the like on basic required amount Pchg0 and that on the actual electric power substantially cancel out each other. Therefore, even in the case where air conditioner 240 and the like consumes large electric power, steps ST108 to ST111 can be performed with high precision.

Further, since the deviation between basic required amount Pchg0 and the actual electric power is smaller in step ST107, a feedback process of correcting basic required amount Pchg0 so that basic required amount Pchg0 is equal to the actual electric power (see step S109 and OP2 in FIG. 8) is completed faster.

Other process steps in the flowchart shown in FIG. 9 are equivalent to the corresponding process steps in the flowchart shown in FIG. 7. Therefore, the description thereof will not be repeated.

Finally, referring again to FIG. 2, the first and second embodiments will be outlined. A power supply apparatus of a vehicle includes: battery 150; converter 200 stepping up a voltage of battery 150 and supplying the stepped-up voltage to inverters 210, 220, first MG 110, and second MG 120 (load); auxiliary machines such as air conditioner 240 electrically connected between battery 150 and converter 200 and driven by means of electric power supplied from battery 150; and control device 500 controlling inverters 210, 220, first MG 110, and second MG 120 based on required vehicle power Pe including required charge discharge amount Pchg of battery 150. Control device 500 has a continuous voltage step-up mode and an intermittent voltage step-up mode. In the continuous voltage step-up mode converter 200 is continuously operated. In the intermittent voltage step-up mode converter 200 is intermittently operated. In the continuous voltage step-up mode, control device 500 calculates required charge discharge amount Pchg (basic required amount Pchg0 for example) based on electric power supplied from battery 150. In the intermittent voltage step-up mode, control device 500 changes a method of calculating required charge discharge amount Pchg to a method that calculates required charge discharge amount Pchg based on electric power passing through converter 200, and makes the required charge discharge amount smaller than the required charge discharge amount in the continuous voltage step-up mode.

Preferably, control device 500 calculates basic required amount Pchg0 based on travel power Tp*. In the continuous voltage step-up mode, control device 500 calculates, as required charge discharge amount Pchg, a correction value determined by correcting basic required amount Pchg0 so that a difference between the electric power supplied from battery 150 and basic required amount Pchg0 is reduced. In the intermittent voltage step-up mode, control device 500 calculates, as required charge discharge amount Pchg, a correction value determined by correcting basic required amount Pchg0 so that a difference between the electric power passing through converter 200 and basic required amount Pchg0 is reduced.

Preferably, control device 500 sets basic required amount Pchg0 to zero in a case where travel power Tp* falls within a predetermined range. The predetermined range in the intermittent voltage step-up mode (see specific range R1 in FIG. 5 (*b*)) is broader than the predetermined range in the continuous voltage step-up mode (see control center CO in FIG. 5 (*a*)).

Although the embodiments of the present invention provide the continuous voltage step-up mode and the intermittent voltage step-up mode, a continuous voltage step-down mode and an intermittent voltage step-down mode may be provided. Namely, MG-ECU 172 sets converter 200 in one of the continuous voltage step-down mode and the intermittent voltage step-down mode. In the continuous voltage step-down mode, converter 200 performs a voltage step-down operation without stopping. In the intermittent voltage step-down mode, converter 200 intermittently repeats a voltage step-down operation and stoppage of the voltage step-down operation. When converter 200 performs the voltage step-down operation, a period in which only switching element Q1 is ON and a period in which both switching elements Q1, Q2 are OFF are alternated. When converter 200 stops the voltage step-down operation, switching element Q1 is fixed in an ON state and switching element Q2 is fixed in an OFF state. In the continuous voltage step-down mode, required charge discharge amount Pchg is calculated based on electric power which is input to battery 150.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

100 engine; 110 first MG; 120 second MG; 112, 122 neutral point; 130 power split device; 131 sun gear; 132 ring gear; 133 pinion gear; 134 carrier; 135 ring gear shaft (driveshaft); 140 reduction gear; 150 battery; 152 battery sensor; 160 drive wheel; 170 PM-ECU; 172 MG-ECU; 180 voltage sensor; 200 converter; 210, 220 inverter; 230 SMR; 240 air conditioner; 500 control device; PL1, PL2 positive line; GL ground line; Q1-Q8 switching element; D1-D8 diode; C1, C2 capacitor; L reactor.

The invention claimed is:
1. A power supply apparatus of a vehicle, comprising:
a power storage device;
a voltage step-up converter stepping up a voltage of said power storage device and supplying the stepped-up voltage to a load;
an auxiliary machine electrically connected between said power storage device and said voltage step-up converter and driven by consuming electric power supplied from said power storage device; and
a control device controlling said load based on a required vehicle power including a required charge discharge amount of said power storage device,
said control device having a continuous voltage step-up mode and an intermittent voltage step-up mode, in said continuous voltage step-up mode said voltage step-up converter being continuously operated, in said intermittent voltage step-up mode said voltage step-up converter being intermittently operated,
in said continuous voltage step-up mode, said control device calculating said required charge discharge amount based on electric power supplied from said power storage device, and
in said intermittent voltage step-up mode, said control device changing a method of calculating said required charge discharge amount to the method that calculates said required charge discharge amount based on electric power passing through said voltage step-up converter, and making said required charge discharge amount smaller than said required charge discharge amount in said continuous voltage step-up mode.

2. The power supply apparatus of a vehicle according to claim 1, wherein
said control device calculates a basic required amount based on a power necessary for travel,
in said continuous voltage step-up mode, said control device calculates, as said required charge discharge amount, a correction value determined by correcting said basic required amount so that a difference between the electric power supplied from said power storage device and said basic required amount is reduced, and
in said intermittent voltage step-up mode, said control device calculates, as said required charge discharge amount, a correction value determined by correcting said basic required amount so that a difference between the electric power passing through said voltage step-up converter and said basic required amount is reduced.

3. The power supply apparatus of a vehicle according to claim 2, wherein
said control device sets a first power range broader than a second power range,
said first power range being a range of power necessary for travel where said basic required amount is zero in said intermittent voltage step-up mode, and
said second power range being a range of power necessary for travel where said basic required amount is zero in said continuous voltage step-up mode.

* * * * *